United States Patent [19]

Newman et al.

[11] Patent Number: 4,577,323
[45] Date of Patent: Mar. 18, 1986

[54] U CHANNEL WAVEGUIDE LASER

[75] Inventors: Leon A. Newman, South Windsor; John T. Kennedy, South Meriden, both of Conn.

[73] Assignee: United Technologies Corporation, Hartford, Conn.

[21] Appl. No.: 529,438

[22] Filed: Sep. 6, 1983

[51] Int. Cl.4 ............................ H01S 3/03; H01S 3/09
[52] U.S. Cl. .......................................... 372/64; 372/82
[58] Field of Search ........................ 372/61, 64, 82, 83

[56] References Cited

U.S. PATENT DOCUMENTS 3,939,439  2/1976  Fletcher et al. ...................... 372/64
4,464,760  8/1984  Sutter, Jr. ............................ 372/61

Primary Examiner—James W. Davie
Attorney, Agent, or Firm—Eric W. Petraske

[57] ABSTRACT

An improved RF-waveguide laser has a waveguide with an asymmetric cross section that provides improved suppression of high order modes and increased efficiency.

3 Claims, 3 Drawing Figures

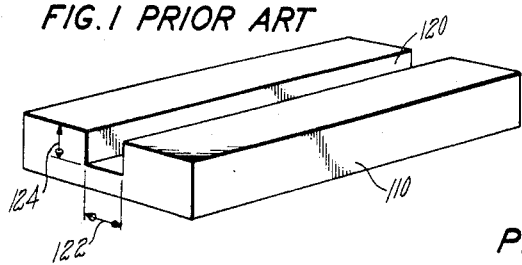
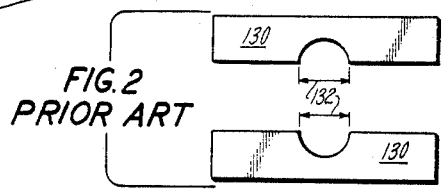
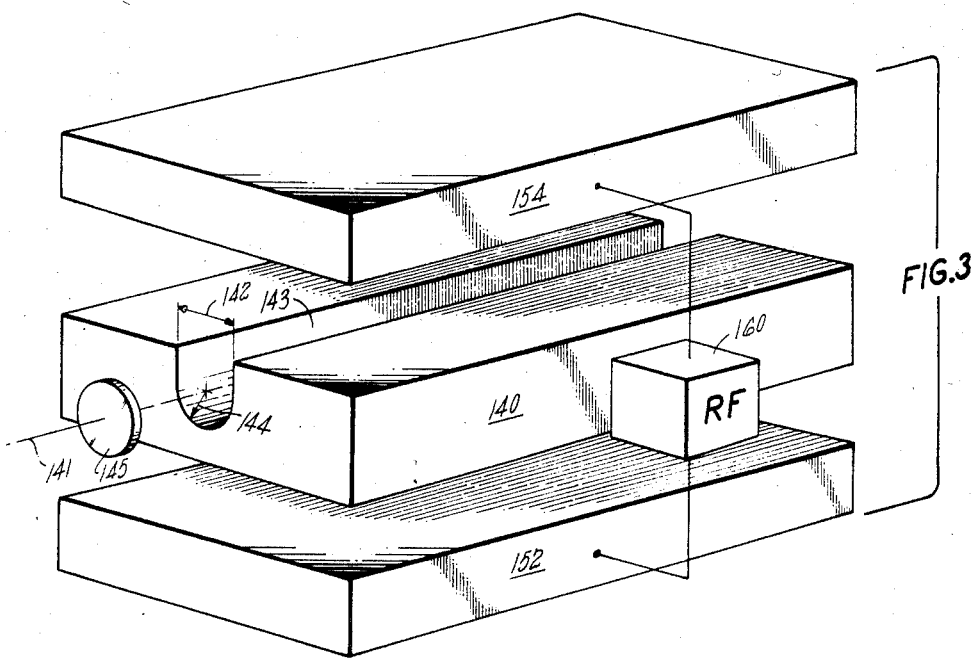

U CHANNEL WAVEGUIDE LASER

DESCRIPTION

1. Technical Field

The field of the invention is that of RF-excited waveguide lasers.

2. Background Art

U.S. Pat. No. 4,363,126, issued on Dec. 7, 1982, to P. P. Chenausky, et al illustrates an RF-excited waveguide laser employing a waveguide having a square cross section of approximately 2 mm on a side. It is also known in the art to employ a waveguide having a circular cross section of approximately the same diameter. A drawback with a circular waveguide is that it is not possible to make a straight waveguide of the length desired in alumina, or berylia, which are preferred for their dielectric properties.

DISCLOSURE OF INVENTION

The invention relates to an improved waveguide laser having a waveguide which has an asymmetric cross section, having generally the form of a U.

BRIEF DESCRIPTION OF DRAWINGS

FIG. 1 illustrates a rectangular waveguide known in the prior art.

FIG. 2 illustrates a circular-cross-section waveguide known in the prior art.

FIG. 3 illustrates a waveguide laser according to the invention.

BEST MODE FOR CARRYING OUT THE INVENTION

The RF-excited waveguide laser has become well established in recent years. Workers in the field have devoted a great deal of attention to improving the efficiency with which the RF-power is converted to radiation that has been coupled out of the waveguide and into free space.

It has long been known that electromagnetic radiation confined in an enclosure such as a waveguide having a transverse dimension of approximately 2 mm with a length on the order of tens of centimeters will have a spatially-varying intensity that may be described mathematically by a superposition of a number of standard forms which are referred to in the field as modes.

The modes for a circular cross section waveguide are illustrated in an article "Hollow Metallic and Dielectric Waveguides for Long Distance Optical Transmission and Lasers" by Marcatili and Schmeltzer in the *Bell System Technical Journal,* Volume 43, pages 1783–1809, 1964. The modes for a rectangular waveguide are illustrated in an article "Field Configurations and Propagation Constants of Modes in Hollow Rectangular Dielectric Waveguides" by H. Krammer, in the *IEEE Journal of Quantum Electronics,* August, 1976, pages 505–507.

Radiation travelling in free space will have a pattern with an intensity variation in a plane perpendicular to the direction of propagation that is described by a set of "free space" modes that are a superposition of Hermite Gaussian functions with various weighting factors. Preferably, the radiation should be concentrated in the lowest order free space mode, referred to as $TEM_{oo}$, because that mode has the best optical properties.

In the design of a laser, it is important to have the radiation within the optical cavity in the form of a cavity mode that both utilizes the gain medium in the cavity efficiently and also couples closely to the desired $TEM_{oo}$ free space mode. For waveguides having cross sections that are round or square, the lowest order mode (referred to as $EH_{11}$) is circularly symmetric and has a radial intensity dependence that is essentially Gaussian. This mode couples well to the $TEM_{oo}$ mode and is the preferred mode of operation for lasers of the type in question. Another mode, referred to as $EH_{12}$, has an intensity distribution in a form of two regions spaced on either side of the optical axis. This mode does not couple well to the free space $TEM_{oo}$ mode and radiation resonated in this mode within the waveguide is essentially wasted because it cannot be transferred to the desired $TEM_{oo}$ mode with high efficiency.

Referring now to FIG. 1, ceramic slab 110 (which may be made alumina or beryllium oxide) contains slot 120 that is formed by grinding the material of slab 110. It has a depth 124 and width 122 which are equal to each other and have a value of 2.25 mm in the embodiment of the above-referenced patent.

FIG. 2 illustrates an alternative waveguide structure from the prior art in which two slabs 130 each have a half circle of diameter 132 ground in them. It is known that a circular cross section is preferable, but the inevitable alignment errors that occur when the two halves are matched remove the advantage of the circular cross section.

Referring now to FIG. 3, a laser constructed according to the invention is shown in exploded form. Two electrodes 152 and 154 are connected to a power supply and impedance matching means 160 as illustrated in the above-referenced patent. The dielectric slab 140 now has a U-shaped groove 143 having a width at the top indicated by the distance 142 and a radius of curvature indicated by radius 144. Optical axis 141 passes through the groove at the center of the half circle defined by radius 144. Mirror 145 forms one boundary of the optical cavity of the laser; another mirror at the opposite end not being shown in order to improve the clarity of the drawing. Groove 143 may be ground by a grinding tool having radius 144 and being controlled to grind out the proper depth.

The cross section of groove 143 differs fundamentally from the prior art square and circular waveguides in that it is not symmetric.

When radiation is resonated in a waveguide, it will assume some intensity distribution that will satisfy the boundary conditions for the particular cross section involved-the intensity distribution being expressed as a sum of terms with different weighting coefficients. One skilled in the art would think that it would take a greater number of terms in the expansion for the electric field in order to match up the asymmetric boundary conditions than would be the case for a symmetric cross section. A greater number of terms, of course, corresponds to a non-negligible amplitude for a greater number of modes. Thus, one skilled in the art would think that a U-shaped cross section would be more susceptible to supporting higher order modes than would a round or square cross section.

It has been found that the square cross section laser of the prior art switches over to oscillate on the $EH_{12}$ mode when the laser is tuned ±200 MHz away from the line center of the desired spectral line. In order for a system employing the prior art square cross section waveguide laser to function properly, it has been necessary to include a detector that discriminates between the desired mode and the undesired mode and a frequency control circuit responsive to this detector in order to force the laser to operate on the desired mode. This circuitry has been made to operate, but it costs additional effort and money in order to accomplish this. It is an advantageous and unexpected feature of the present invention that the asymmetric cross section operates to suppress the undesired mode to a greater degree than the symmetric cross section does, so that mode control circuitry is unnecessary.

It is an advantageous feature of this improved waveguide that it is still as simple to fabricate and assemble as the square bore waveguide.

Further, this waveguide shape is also compatible with the fabrication of a laser including having folded waveguide resonators comprised of a number of grooves which connect together in the form of the letters V, Z, or X.

A further advantageous feature of the invention is that the U channel waveguide provides as high an output power per unit length as the square bore waveguide, but does so with improved efficiency; i.e. it produces the same optical output power with less electrical input power.

We claim:

1. An RF-powered waveguide laser comprising:

first and second electrodes having first and second parallel, facing electrode surfaces positioned on opposite sides of an optical axis;

an insulating member positioned between said first and second parallel electrode surfaces and containing an optical waveguide disposed about said optic axis;

reflective means for defining an optical cavity containing said waveguide;

a gain medium disposed within said optical cavity;

RF-pumping means for applying power to said electrodes for resonating, in at least one electromagnetic mode, laser radiation in said gain medium disposed within said optical cavity; characterized in that:

said optical waveguide has a cross section perpendicular to said optic axis that is asymmetric about said optic axis.

2. A laser according to claim 1, in which said asymmetric cross section has a semicircular region having a predetermined radius of curvature about said optic axis and a rectangular region extending a predetermined distance from said optic axis toward one of said electrodes.

3. A laser according to claim 2, in which said predetermined distance is substantially equal to said radius of curvature.

* * * * *